(12) United States Patent
Yuan

(10) Patent No.: US 9,303,651 B2
(45) Date of Patent: Apr. 5, 2016

(54) BEARING CUP STRUCTURE AND THERMAL MODULE THEREOF

(75) Inventor: Meihua Yuan, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 732 days.

(21) Appl. No.: 13/429,850

(22) Filed: Mar. 26, 2012

(65) Prior Publication Data

US 2013/0251530 A1    Sep. 26, 2013

(51) Int. Cl.
*F04D 19/00* (2006.01)
*F04D 29/05* (2006.01)
*F16C 35/00* (2006.01)
*F04D 25/06* (2006.01)
*F04D 29/056* (2006.01)
*F16C 35/02* (2006.01)
*F04D 29/60* (2006.01)

(52) U.S. Cl.
CPC .......... *F04D 25/062* (2013.01); *F04D 29/056* (2013.01); *F04D 29/601* (2013.01); *F16C 35/00* (2013.01); *F16C 35/02* (2013.01)

(58) Field of Classification Search
CPC . F04D 25/062; F04D 25/0626; F04D 29/056; F04D 29/601; F16C 35/00; F16C 35/02
USPC ............. 415/175–178, 229; 416/174, 95; 417/423.12; 165/80.3, 121; 384/100, 384/226, 428
See application file for complete search history.

(56) References Cited

U.S. PATENT DOCUMENTS

| | | | |
|---|---|---|---|
| 5,437,327 A * | 8/1995 | Chiou | 165/122 |
| 6,309,191 B1* | 10/2001 | Hu | 417/423.12 |
| 7,647,690 B2* | 1/2010 | Hada | 29/596 |
| 2005/0265641 A1* | 12/2005 | Shishido et al. | 384/107 |
| 2006/0255674 A1* | 11/2006 | Chen et al. | 310/90 |
| 2007/0013247 A1* | 1/2007 | Tung et al. | 310/90 |
| 2009/0028701 A1* | 1/2009 | Kao | 415/231 |
| 2009/0161253 A1* | 6/2009 | Shirai et al. | 360/99.08 |
| 2010/0266394 A1* | 10/2010 | Luo | 415/177 |
| 2010/0329901 A1* | 12/2010 | Horng | 417/354 |
| 2011/0091314 A1* | 4/2011 | Li | 415/180 |

\* cited by examiner

*Primary Examiner* — Igor Kershteyn
*Assistant Examiner* — Jesse Prager
(74) *Attorney, Agent, or Firm* — C. G. Mersereau; Nikolai & Mersereau, P.A.

(57) ABSTRACT

A bearing cup structure and a thermal module thereof. The bearing cup structure includes a cup body and a retainer ring. The cup body has a fixing section, a receiving space and a shoulder section. The fixing section is formed at one end of the cup body. The shoulder section is formed in the receiving space. The retainer ring is formed with a hole in communication with the receiving space. With the bearing cup structure, the heat dissipation efficiency of the thermal module is increased and the assembling time is shortened to lower the manufacturing cost.

2 Claims, 8 Drawing Sheets

BEARING CUP STRUCTURE AND THERMAL MODULE THEREOF

BACKGROUND OF THE INVENTION

1. Field of the Invention

The present invention relates generally to an improved bearing cup structure and a thermal module thereof. With the bearing cup structure, the heat dissipation area of the thermal module is increased to greatly promote the heat dissipation performance. Moreover, the assembling time is shortened to lower the manufacturing cost.

2. Description of the Related Art

Following the development of electronic industries and techniques, all kinds of electronic products (such as computers) have been more and more popularly used and widely applied to various fields. With these electronic products, the data are processed faster and faster. When operating at high speed, the electronic products consume much power and generate high heat at the same time. In order to make the electronic products operate stably, a high-efficiency heat dissipation unit is necessary.

With a computer taken as an example, when the computer operates at high speed, the central processing unit (CPU) in the computer will generate high heat to result in unstable operation of the CPU. In case the heat is not efficiently dissipated, the temperature of the CPU will rise very quickly to cause crash of the computer. In some serious cases, the CPU may even burn down. Therefore, it has become a critical issue how to quickly conduct out and dissipate the heat generated by the CPU and other heat-generating components.

Conventionally, a thermal module is arranged on the CPU to dissipate heat generated by the CPU. The thermal module is mainly composed of a fan and a heat dissipation unit. The fan is locked on the heat dissipation unit, while the heat dissipation unit is disposed on the CUP. The heat generated by the CPU in operation on one hand is dissipated by the heat dissipation unit and on the other hand is carried away by the wind blown to the heat dissipation unit by the fan. Accordingly, the heat is continuously carried away from the heat dissipation unit to avoid overheating of the CPU and thus avoid deterioration of working efficiency of the CPU.

Please refer to FIGS. 1A and 1B. FIG. 1A is a perspective exploded view of a conventional thermal module. FIG. 1B is a perspective assembled view of the conventional thermal module. The conventional thermal module 1 includes a fan 10, a base seat 11 and a heat dissipation unit 12. The heat dissipation unit 12 has a main body 121 and multiple radiating fins 122 extending from the main body. The base seat 11 is fixedly disposed on the main body 121. Multiple locating sections 111 extend from a periphery of the base seat 11. Each locating section 111 has at least one locating hole 1111. A locking member 13 is passed through the locating hole 1111 to lock the base seat 11 on the heat dissipation unit 12. Such thermal module 1 has a structure necessitating a large axial room so that the thermal module 1 has a considerably large volume to occupy much space. The locating sections 111 locked on the heat dissipation unit 12 occupy a certain height and area so that the base seat 11 must have a sufficient height for installing the fan 10. As a result, the resistance against airflow of the fan 10 is increased. This will affect the heat dissipation performance of the heat dissipation unit 12 and reduce the heat dissipation area of the radiating fins 122.

Moreover, the locating sections 111 must be locked on the heat dissipation unit 12 by means of the locking members 13 passing through the locating holes 1111. Such assembling process is quite time-consuming so that the manufacturing cost is increased. Furthermore, the base seat 11 and the locating sections 111 are generally made of plastic material. When molded, the base seat 11 and the locating sections 111 are subject to deformation. This will affect the precision of the size of the product.

According to the above, the conventional thermal module has the following shortcomings:
1. The heat dissipation performance is deteriorated.
2. The heat dissipation area is reduced.
3. It is time-consuming to assemble the components.
4. The manufacturing cost is increased.
5. The base seat and the locating sections are subject to deformation.

SUMMARY OF THE INVENTION

A primary object of the present invention is to provide an improved bearing cup structure, which is able to increase the heat dissipation area of the thermal module so as to greatly promote the heat dissipation performance of the thermal module.

A further object of the present invention is to provide the above bearing cup structure, which can be assembled in a shorter time to increase production efficiency and lower manufacturing cost.

A still further object of the present invention is to provide a thermal module, which has larger heat dissipation area and better heat dissipation performance.

A still further object of the present invention is to provide the above thermal module, which can be assembled in a shorter time to increase production efficiency and lower manufacturing cost.

To achieve the above and other objects, the bearing cup structure of the present invention includes a cup body and a retainer ring. The cup body has a fixing section, a receiving space and a shoulder section. The fixing section is formed at one end of the cup body. The shoulder section is formed in the receiving space. The retainer ring is attached to the shoulder section and formed with a hole in communication with the receiving space. With the bearing cup structure, the heat dissipation area of the thermal module is greatly increased to promote the heat dissipation performance of the thermal module.

In the above bearing cup structure, the cup body is easy to form and is not subject to deformation. Moreover, the cup body is located at one single point instead of the multiple points of the conventional structure so that the assembling process is simplified to increase the production efficiency and lower the manufacturing cost.

The thermal module of the present invention includes a heat dissipation unit, a cup body, a retainer ring, a fan impeller assembly and a bearing. The heat dissipation unit has a main body and multiple radiating fins extending from a periphery of the main body. A center of the main body is formed with a locating section. The cup body has a fixing section, a receiving space and a shoulder section. The fixing section is formed at one end of the cup body and affixed to the locating section. The shoulder section is formed in the receiving space. The retainer ring is attached to the shoulder section and formed with a hole in communication with the receiving space. The fan impeller assembly has a shaft rod extending from the fan impeller assembly and received in the receiving space. The shaft rod passes through the hole of the retainer ring. One end of the shaft rod, which end is distal from the fan impeller assembly is formed with an engagement section. The retainer ring is correspondingly engaged in the engagement section. The bearing is fitted on the shaft rod and received in the receiving space. The thermal module has larger heat dissipation area and better heat dissipation performance.

In the above thermal module, the cup body is screwed into the locating section of the heat dissipation unit and located at one single point instead of the multiple points of the conventional structure. Therefore, the assembling process is simplified to save time, increase the production efficiency and lower manufacturing cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
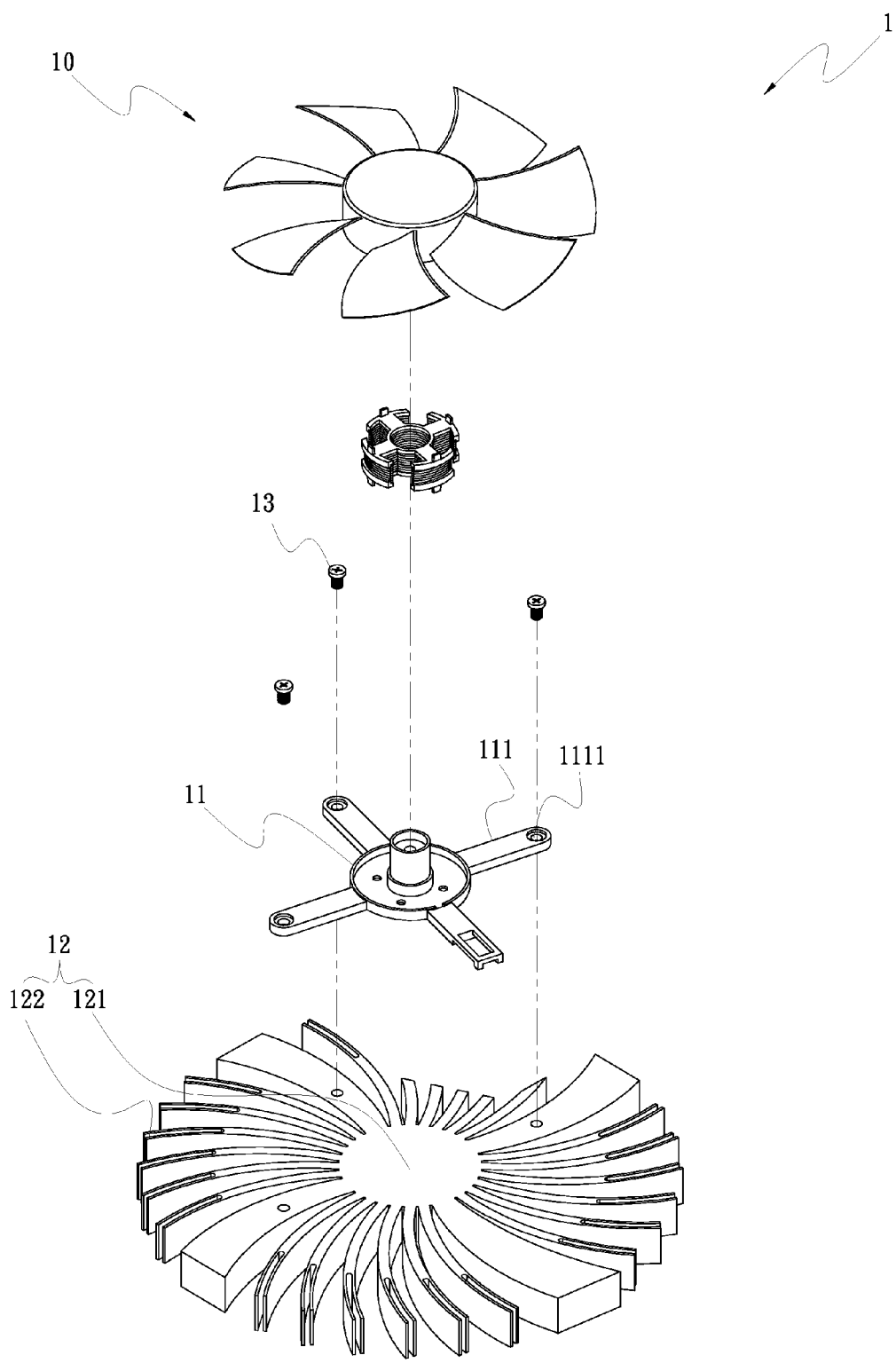
FIG. 1A is a perspective exploded view of a conventional thermal module.
Figure 1B:
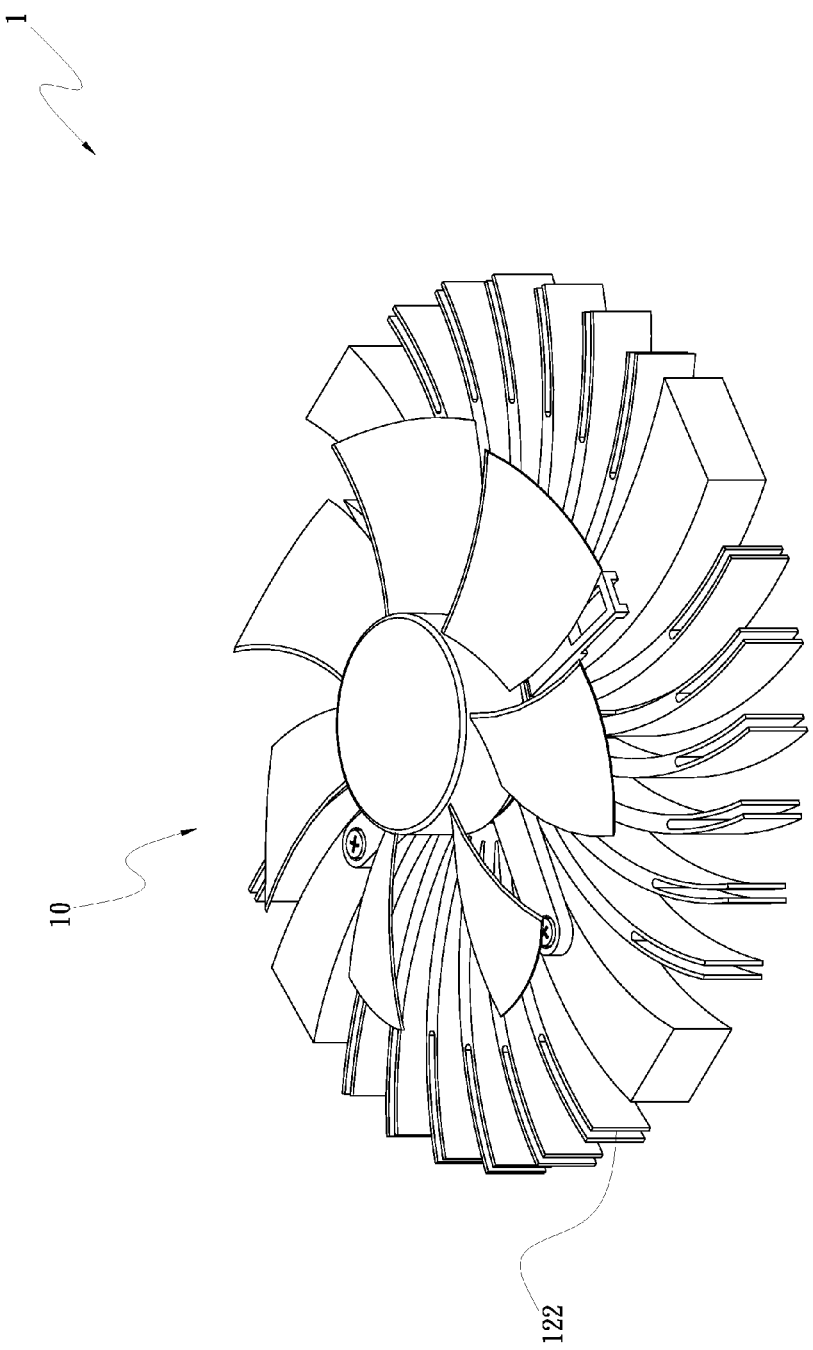
FIG. 1B is a perspective assembled view of the conventional thermal module.
Figure 2A:
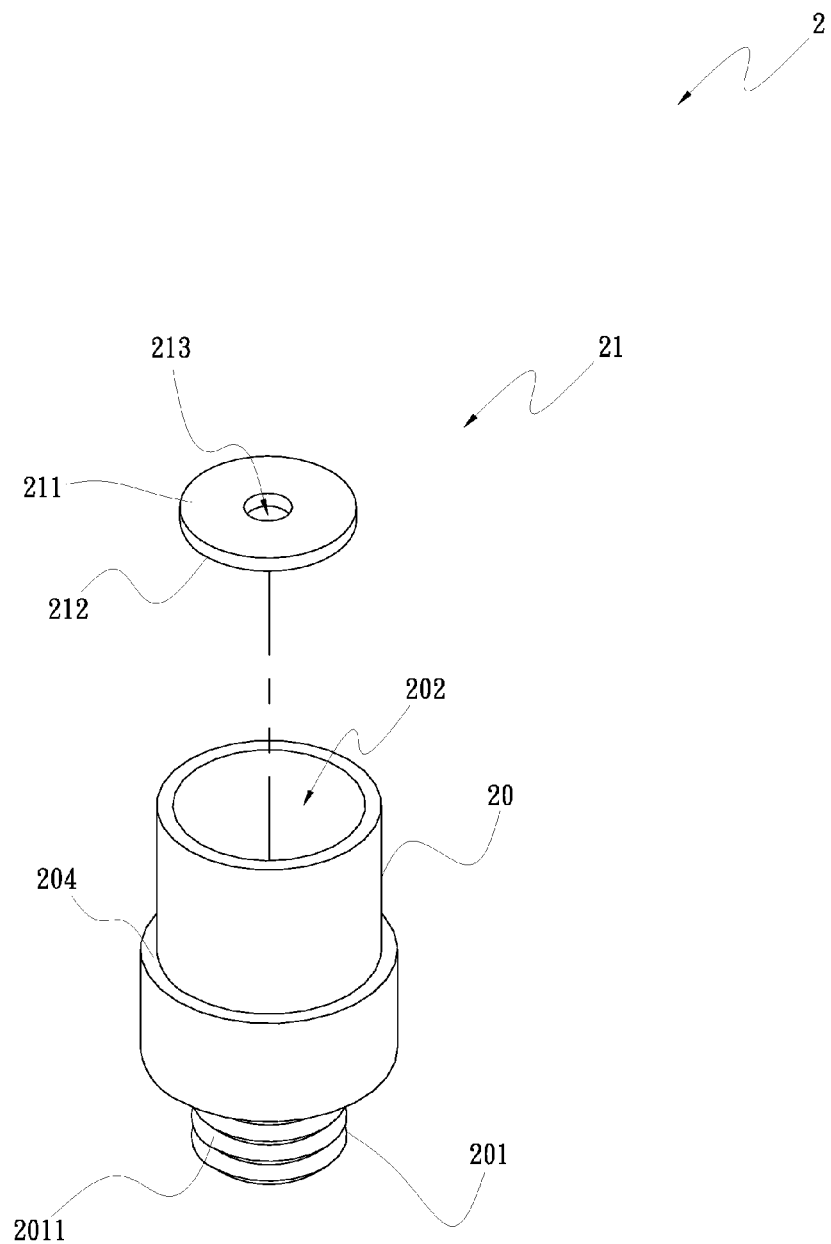
FIG. 2A is a perspective exploded view of a first embodiment of the bearing cup structure of the present invention.
Figure 2B:
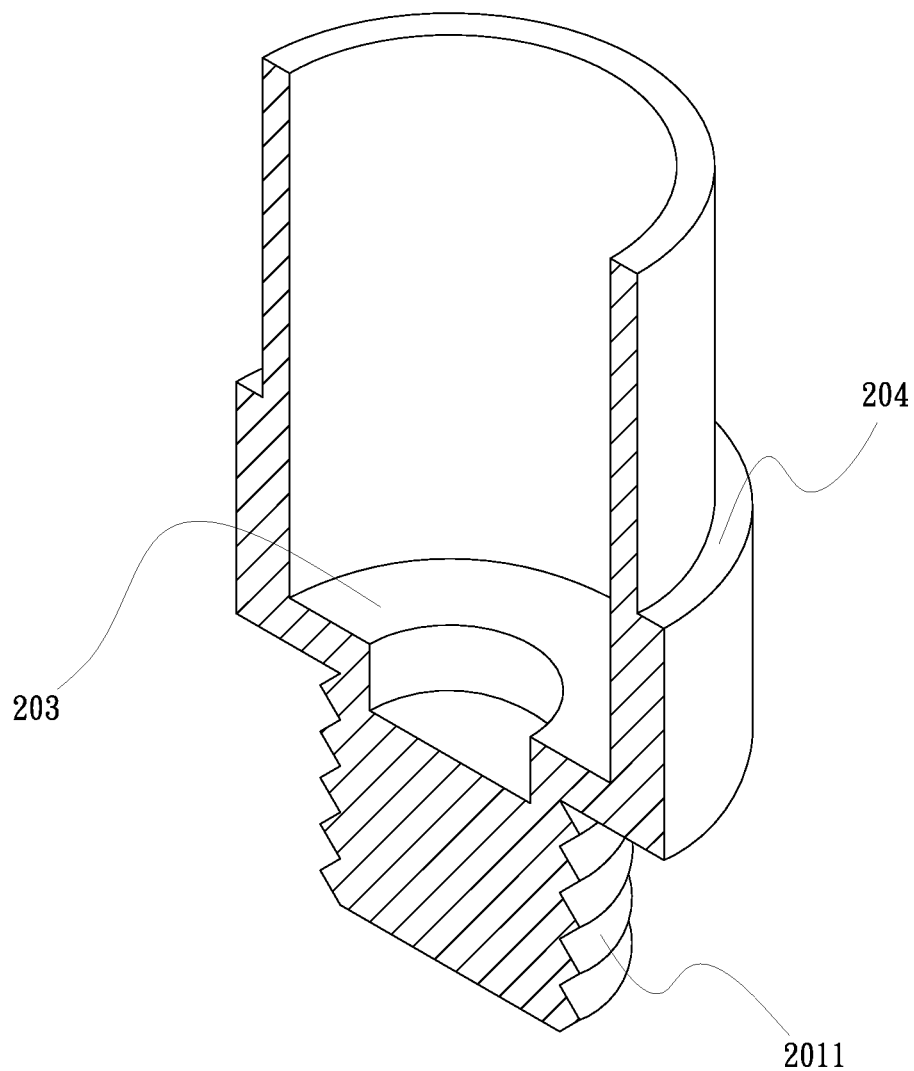
FIG. 2B is a sectional view of the cup body of the first embodiment of the bearing cup structure of the present invention.
Figure 2C:
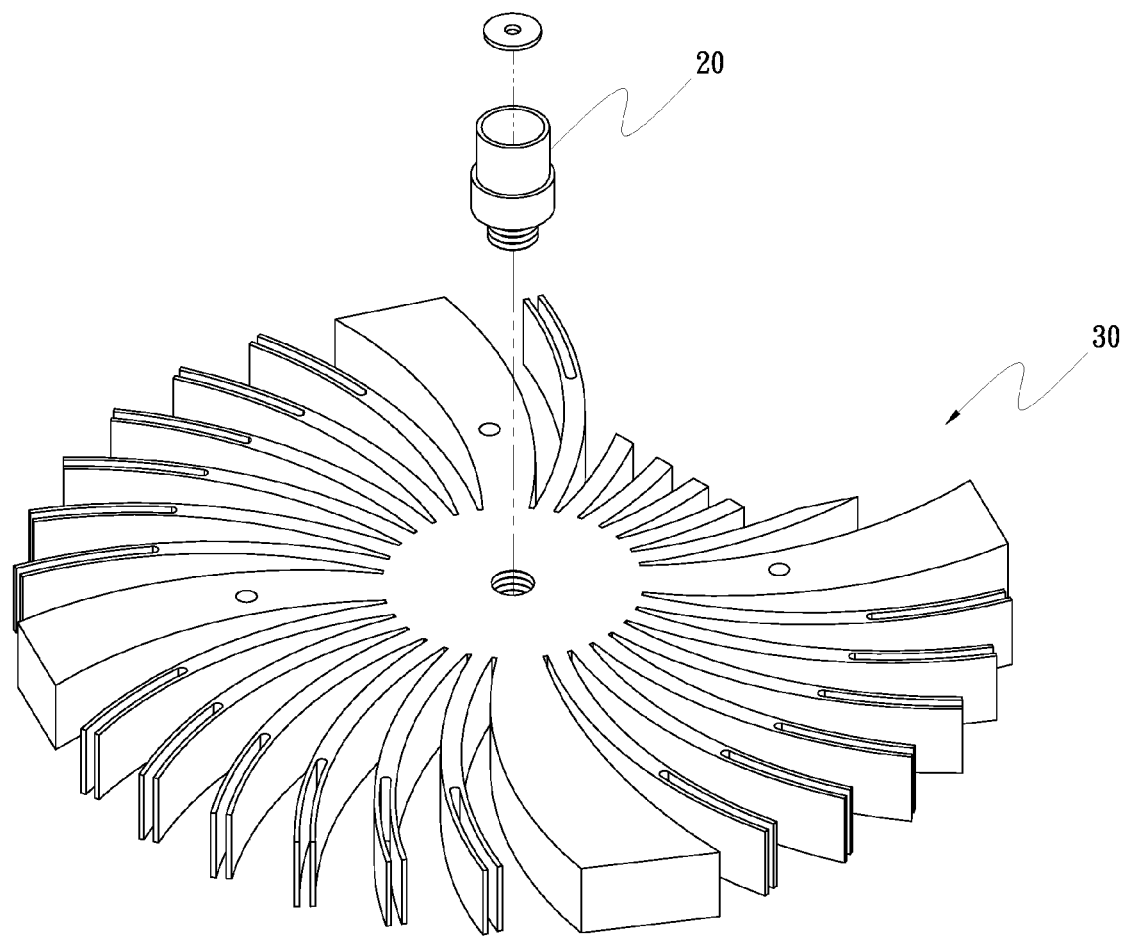
FIG. 2C is a perspective exploded view of the first embodiment of the bearing cup structure of the present invention, also showing a heat dissipation unit on which the cup body is fixed.

Please refer to FIGS. 2A, 2B and 2C. FIG. 2A is a perspective exploded view of a first embodiment of the bearing cup structure of the present invention. FIG. 2B is a sectional view of the cup body of the first embodiment of the bearing cup structure of the present invention. FIG. 2C is a perspective exploded view of the first embodiment of the bearing cup structure of the present invention, also showing a heat dissipation unit on which the cup body is fixed. According to this embodiment, the bearing cup structure 2 of the present invention includes a cup body 20 and a retainer ring 21. The cup body 20 has a fixing section 201, a receiving space 202, a shoulder section 203 and a peripheral edge 204. The peripheral edge 204 is formed on and surrounds a part of an outer wall of the cup body 20. The fixing section 201 is formed at one end of the cup body 20 below the peripheral edge. Multiple threads 2011 are formed on a circumference of the fixing section 201. The shoulder section 203 is formed in the receiving space 202. The retainer ring 21 is attached to the shoulder section 203 and formed with a hole 213 in communication with the receiving space 202. The retainer ring 21 has a first side 211 and a second side 212. The second side 212 is attached to the shoulder section 203.

Please further refer to FIG. 2C. By means of the threads, the cup body 20 can be fixedly located on a heat dissipation unit 30. The bearing cup structure 2 has smaller volume and is free from the conventional base seat and locating sections so that the occupied room is reduced and the heat dissipation area of the heat dissipation unit 30 is increased to greatly promote the heat dissipation performance. In addition, the cup body 20 of the present invention can be affixed onto the heat dissipation unit 30 without using the conventional base seat and locating sections. Therefore, the cost for making the molds of the conventional base seat and locating sections is saved. Moreover, the cup body 20 is easy to form and is not subject to deformation. Also, the cup body 20 is located at one single point instead of the multiple points of the conventional structure so that the assembling time is shortened to increase the production efficiency and greatly lower the manufacturing cost.

Figure 3A:
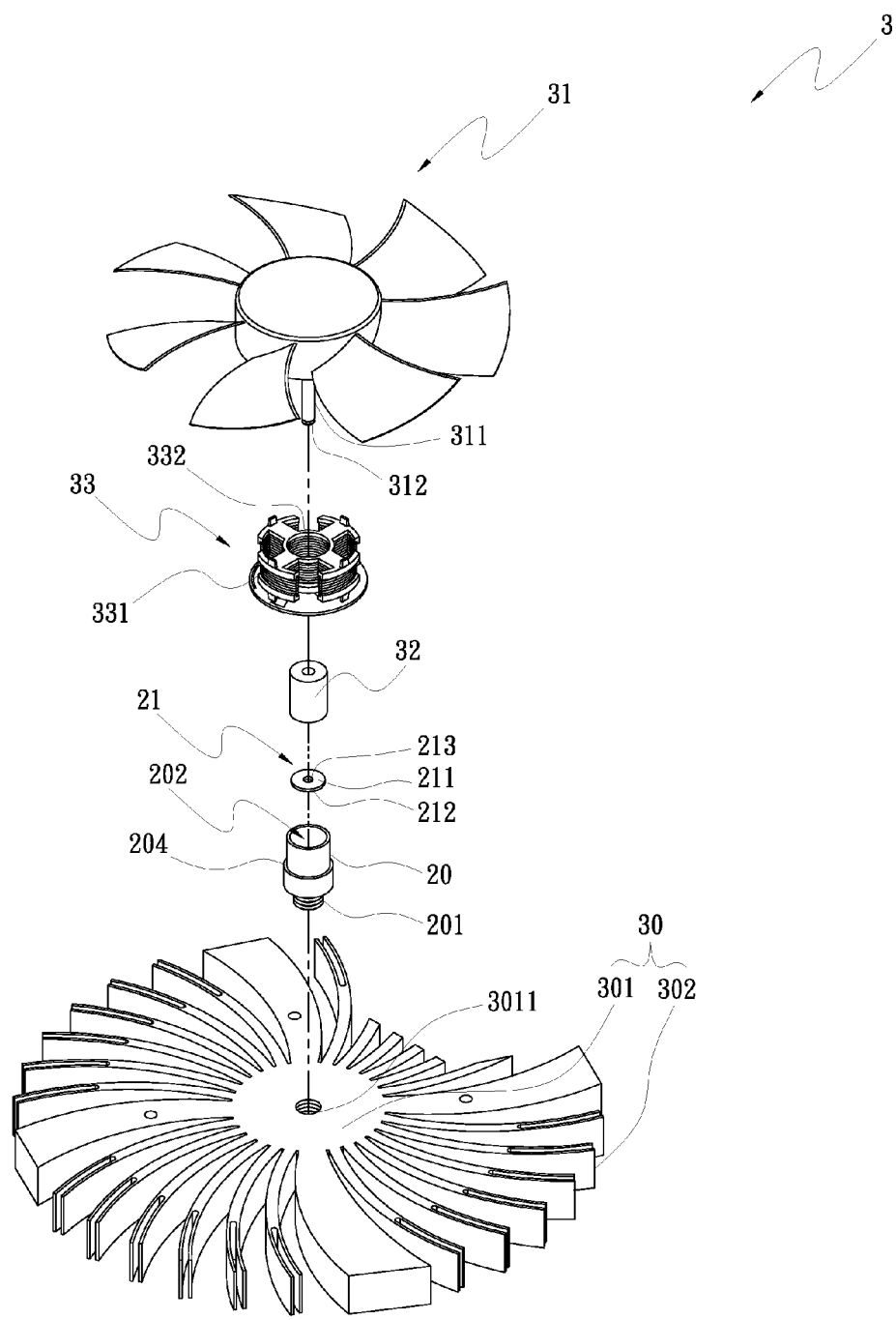
FIG. 3A is a perspective exploded view of a first embodiment of the thermal module of the present invention.
Figure 3B:
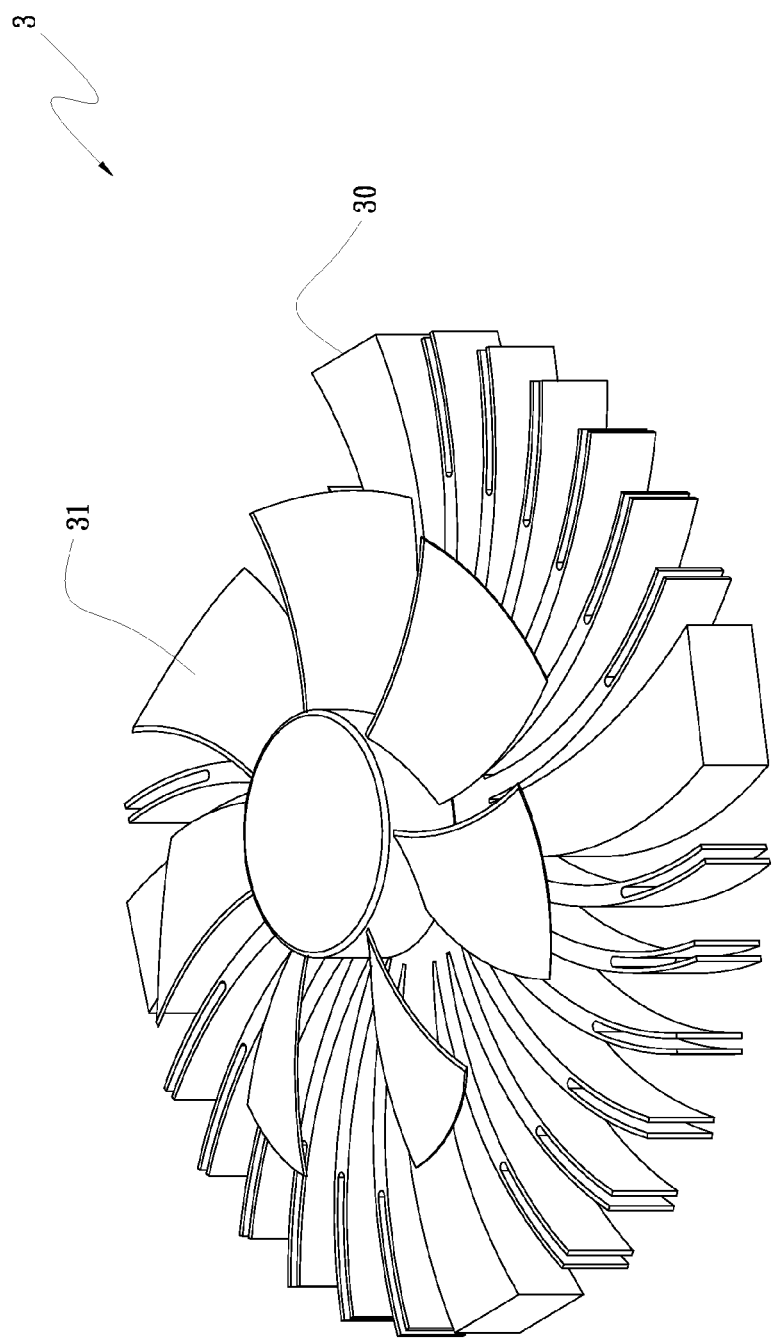
FIG. 3B is a perspective assembled view of the first embodiment of the thermal module of the present invention.
Figure 3C:
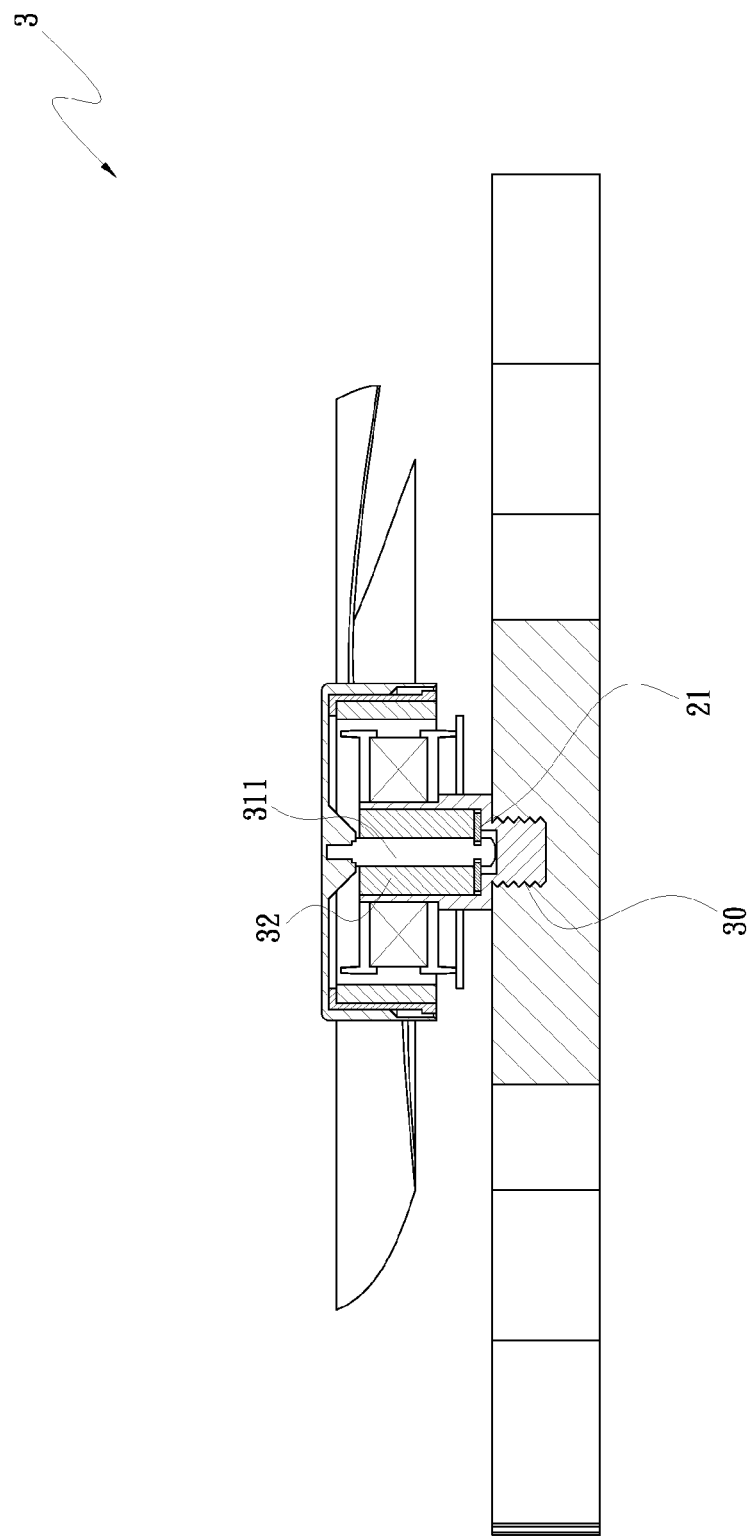
FIG. 3C is a sectional assembled view of the first embodiment of the thermal module of the present invention.

Please refer to FIGS. 3A, 3B and 3C. FIG. 3A is a perspective exploded view of a first embodiment of the thermal module of the present invention. FIG. 3B is a perspective assembled view of the first embodiment of the thermal module of the present invention. FIG. 3C is a sectional assembled view of the first embodiment of the thermal module of the present invention. Also referring to FIG. 2B, according to this embodiment, the thermal module 3 of the present invention includes a heat dissipation unit 30, a cup body 20, a retainer ring 21, a fan impeller assembly 31, a bearing 32 and a stator assembly 33. The heat dissipation unit 30 has a main body 301 and multiple radiating fins 302 extending from a periphery of the main body 301. A center of the main body 301 is formed with a locating section 3011. The cup body 20 has a fixing section 201, a receiving space 202, a shoulder section 203 and a peripheral edge 204. The peripheral edge 204 is formed on and surrounds a part of an outer wall of the cup body 20. The fixing section 201 is formed at one end of the cup body 20 below the peripheral edge 204 and affixed to the locating section 3011. Multiple threads 2011 are formed on a circumference of the fixing section 201. The shoulder section 203 is formed in the receiving space 202. The retainer ring 21 is formed with a hole 213 in communication with the receiving space 202. The retainer ring 21 has a first side 211 and a second side 212. One end of the bearing 32 is attached to the first side 211. The second side 212 is attached to the shoulder section 203. The stator assembly 33 includes a plurality of and a through hole 332. The through hole 332 is used to receive the cup body 20, further to engage with the peripheral edge 204 of the cup body 20.

The fan impeller assembly 31 has a shaft rod 311 extending from the fan impeller assembly 31 and received in the receiving space 202. The shaft rod 311 passes through the hole 213. One end of the shaft rod 311, which end is distal from the fan impeller assembly 31 is formed with an engagement section 312. The retainer ring 21 is correspondingly engaged in the engagement section 312. The bearing 32 is fitted on the shaft rod 311 and received in the receiving space 202.

The fixing section 201 of the cup body 20 is screwed into the locating section 3011 of the heat dissipation unit 30. Then the bearing 32 is fitted onto the shaft rod 311 and fitted into the receiving space 202. The shaft rod 311 is passed through the hole 213 of the retainer ring 21 and the bearing 32 is attached to the first side 211 of the retainer ring 21. The second side 212 is attached to the shoulder section 203. Under such circumstance, the retainer ring 21 is engaged in the engagement section 312 of the shaft rod 311. The cup body 20 has a much smaller volume so that the heat dissipation area of the heat dissipation unit 30 is increased to promote the heat dissipation performance. In addition, the cup body 20 of the present invention can be affixed onto the heat dissipation unit 30 without using the conventional base seat and locating sections. Therefore, the manufacturing cost is lowered. Also, the cup body 20 is screwed into the locating section 3011 of the heat dissipation unit 30 and located at one single point instead of the multiple points of the conventional structure so that the assembling process is simplified to save time and increase the production efficiency.

According to the above, in comparison with the conventional thermal module, the present invention has the following advantages:

1. The heat dissipation performance is promoted.
2. The heat dissipation area is increased.
3. The cup body is not subject to deformation.
4. The assembling process is simplified.
5. The manufacturing cost is lowered.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A bearing cup structure for assembly into a locating section of a main body of a thermal module comprising:
   a main body having a round center formed with a single locating section that only partially penetrates the main body and multiple integrally formed curved radiating fins radially distributed and extending outward from said center and having the same height as the center, the locating section having an inner helical thread;
   a cup body having a single fixing section, a receiving space, a shoulder section and a peripheral edge, the peripheral edge being formed on and surrounding a part of an outer wall of the cup body, the fixing section being formed at one end of the cup body below the peripheral edge, the shoulder section being formed in the receiving space; the fixing section further having a circumferential outer helical thread; and
   a retainer ring attached to the shoulder section and formed with a hole in communication with the receiving space;
   wherein the retainer ring has a first side and a second side, the second side being attached to the shoulder section; and
   wherein the outer helical thread of the fixing section is threaded with the helical inner thread of the locating section to lock the cup body in the locating section.

2. A thermal module comprising:
   a heat dissipation unit having a main body and multiple integrally formed curved radiating fins having the same height as the main body and radially extending outward from and beyond a periphery of the main body, a center of the main body being formed with a single locating section that extends only part way into said main body, the locating section having a helical inner thread;
   a cup body having a fixing section, a receiving space, a shoulder section and a peripheral edge, the peripheral edge being forming on and surrounding a part of an outer wall of the cup body, the fixing section being formed at one end of the cup body below the peripheral edge, the fixing section further having a helical circumferential thread that is threaded with the inner thread of the locating section for locking the cup body; to the locating section, the shoulder section being formed in the receiving space;
   a retainer ring attached to the shoulder section and formed with a hole in communication with the receiving space;
   a fan impeller assembly having a shaft rod extending from the fan impeller assembly and received in the receiving space, the shaft rod passing through the hole of the retainer ring, one end of the shaft rod, which end is distal from the fan impeller assembly being formed with an engagement section, the retainer ring being correspondingly engaged in the engagement section;
   a bearing fitted on the shaft rod and received in the receiving space; and
   a stator assembly including a plurality of stacked plates and a through hole, the through hole being used to receive the cup body, further to engage with the peripheral edge of the cup body;
   wherein the retainer ring has a first side and a second side, one end of the bearing being attached to the first side, the second side being attached to the shoulder section.

* * * * *